UNITED STATES PATENT OFFICE.

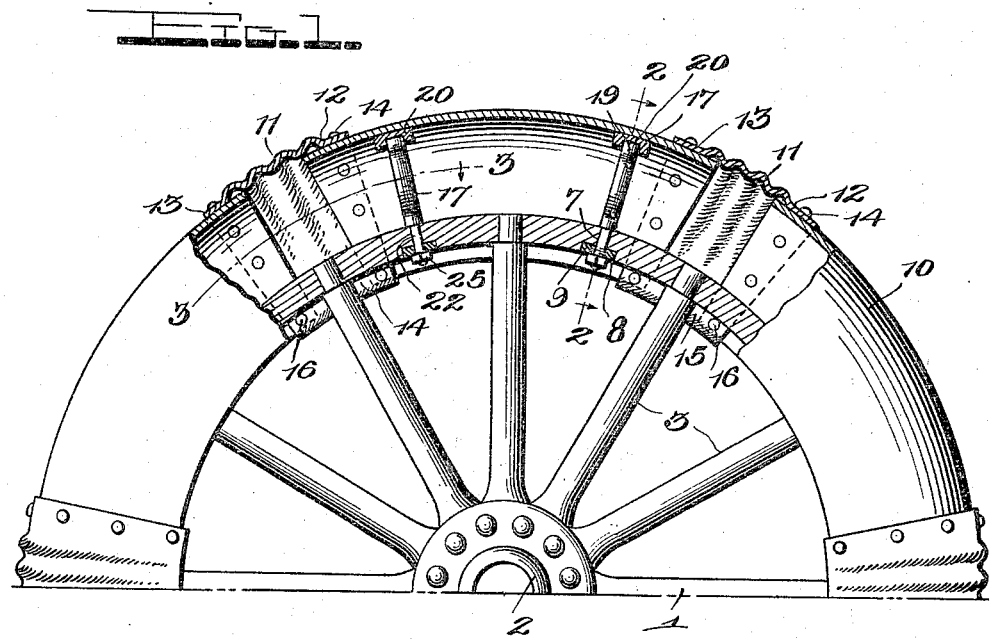
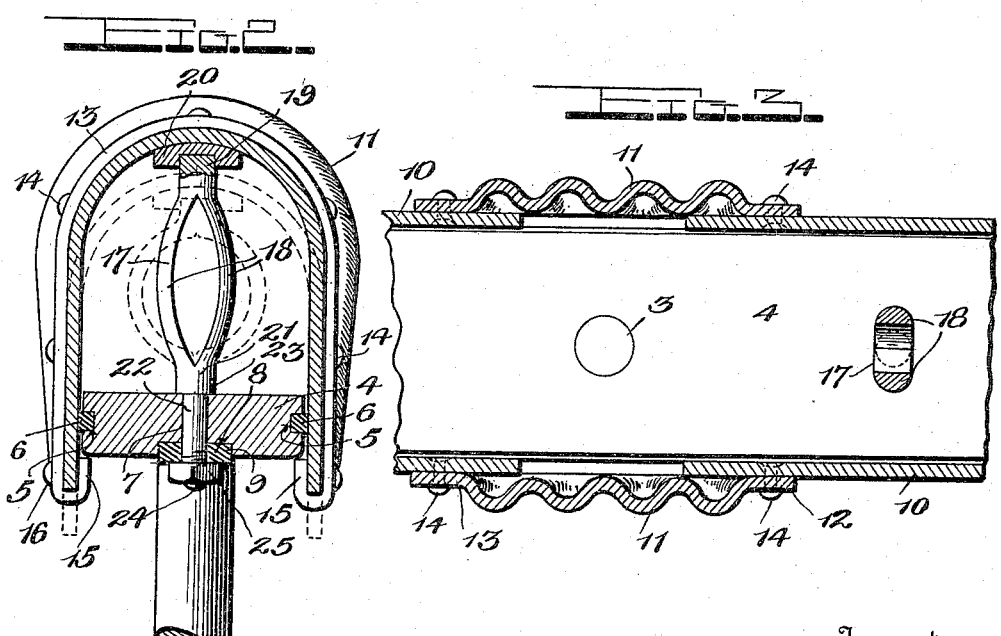

PLATT L. HUNT, OF LITCHFIELD, PENNSYLVANIA.

RESILIENT VEHICLE-WHEEL.

1,186,787.                Specification of Letters Patent.        Patented June 13, 1916.

Application filed February 28, 1916. Serial No. 81,028.

*To all whom it may concern:*

Be it known that I, PLATT L. HUNT, a citizen of the United States, residing at Litchfield, in the county of Bradford and State of Pennsylvania, have invented certain new and useful Improvements in Resilient Vehicle-Wheels; and I do declare the following to be a full, clear, and exact description of the invention, such as will enable others skilled in the art to which it appertains to make and use the same.

This invention relates to new and useful improvements in resilient vehicle wheels.

The primary object of the invention is to provide a wheel, with a tire formed of a plurality of metallic sections arranged to house resilient means for spacing the same from the wheel rim.

Another object of this invention is to provide a device of this character with a plurality of sections which are spaced from the rim by bowed springs which are removably connected with the said rim, so that the sections may be easily removed therefrom.

A further object of this invention is to provided a device of this character which is simple and durable in construction, inexpensive to manufacture, and one which will be very efficient in operation.

With these and numerous other objects in view, my invention consists of the novel feature of construction, combination and arrangement of parts which will be herein referred to and more particularly pointed out in the specification and claims.

In the accompanying drawings: Figure 1 is a side elevation of one-half of a vehicle wheel, with a portion broken away, showing in section one entire section of the tire and the way it is connected to the rim, and also of means for connecting the same with the adjacent ends of the contiguous sections; Fig. 2 is a transverse section taken on the line 2—2 of Fig. 1; and Fig. 3 is a section taken on the line 3—3 of Fig. 1.

In the drawings, the numeral 1 designates a vehicle wheel of any preferred form having a hub 2 with projecting spokes 3, which have secured to their outer ends a rigid rim 4. This rigid rim 4 has annular grooves 5 positioned at its opposite sides and adapted to receive therein correspondingly shaped packing rings 6 which project a short distance therefrom. This rim is also provided with a plurality of radially extending openings 7 which are preferably spaced equidistant between the ends of the spokes 3, and have countersunk portions 8 adjacent their inner ends. Positioned in the portions 8 are countersunk packing nuts or rings 9, which are formed of rubber, fiber, or any other desired material, for a purpose to be hereinafter more fully described. The tread portion of this wheel consists of a plurality of substantially U-shaped metallic tread sections 10, which are adapted to straddle the rim 4, and have their inner ends slidably engaged with the packing rings 6 of the same. These substantially U-shaped metallic sections are spaced circumferentially around the rim and are spaced from each other as clearly shown in Figs. 1 and 3 of the drawings. The spaced ends of the sections 10 are connected by means of corrugated pads 11 which are slightly flexible, being formed of some material such as leather, which while having a certain amount of rigidity, are adapted under pressure to be flexible. These corrugated pads 11 are secured at their opposite ends 12 and 13 by bolts or rivets 14 on the outer surfaces of the adjacent ends of contiguous sections. By this means, a flexible connection is formed between the different sections which make up the tread portion of this wheel for a purpose which is obvious in devices of this character.

The extremities of the corrugated pads 11 overlap the inner ends of the adjacent metallic sections 10, as shown at 15, and are adapted to be positioned when the sections are not under pressure against the inner surface or wall of the rim 4. By this positioning, the opening between the ends of the sections will be entirely covered, so that there will be an impossibility of any dust or dirt entering between the sections and the rim. The overlapped ends 15 of the pads 11 are secured in position by means of bolts or rivets 16, which secure the ends of the same to the adjacent inner surfaces of the inner ends of the sections, as clearly shown in Fig. 1 of the drawings.

The resilient means which are employed in this device and which are adapted to space the metallic sections 10 from the rim, comprise spring bars 17 which are split longitudinally intermediate their ends to form bowed arms 18 which are united at their outer ends 19, and secured to the center of the inner surface of the metallic sections as shown at 20 in the drawings. In the accompanying drawings, these outer ends 19 are secured to the center of the sections by means of welding, which gives the same a safe and secure engagement therewith. The inner ends of the springs 17 are united as shown at 21, and are provided with reduced shanks 22 which are adapted to project through the openings 7 in the rim 4. When these reduced shanks 22 project through the radial openings, the shoulder 23 formed by the same, will be adapted to rest upon the outer surface of the said rim, as clearly shown in Figs. 1 and 2 of the drawings. The projecting ends of the shanks 22 are screw threaded as shown at 24 and are adapted to receive thereon locking nuts 25 which will securely hold the springs in position. The projecting ends of the shanks 22 are surrounded by the packing nuts 9 which are countersunk in the inner surface of the rim 4, surrounding the openings 7, so that there will be no possibility of any dust or dirt being likely to work through said opening and into the space between the rim and the sections.

When the various parts of this device are assembled as has been herein described, and are in the position shown in Figs. 1 and 2 of the drawings, which is the normal position they assume when not under pressure, it will be obvious that when the wheel is revolved, these sections will in turn come in contact with the ground and pressure will be placed thereon, whereupon, owing to the bowed spring arms 18 of the springs 17, the section under pressure will give and the arms and section will assume the position shown in dotted lines in Fig. 2 of the drawings. This will give the desired amount of resiliency to the wheel and yet afford a very simple and strong device of this character adapted for various uses which these wheels are put to. The flexible pads which connect the ends of the sections, allow for the various movements of the different sections, and prevent any dirt from working in between the same. These flexible corrugated pads also act as anti-skid devices, and do away with the necessity of employing anti-skid chains.

From the foregoing description, the use and operation of this invention will be readily understood, and it will be seen that I have provided an easily constructed and simple device of this character for carrying out the objects of the invention.

I claim:

1. A device of the class described comprising a wheel body with a rigid rim, a plurality of substantially U-shaped metallic tread sections straddling said rim and slidably engaged therewith, said sections being positioned circumferentially around the rim with their ends spaced apart, resilient means connecting said sections and the rim, and flexible corrugated pads connecting the ends of said sections and excluding dirt from entering therebetween.

2. A device of the class described comprising a wheel body having a rigid rim, annular packing rings in the sides of said rim, a plurality of substantially U-shaped metallic tread sections straddling said rim and slidably engaging the packing rings in its sides, said sections being positioned circumferentially around the rim with their ends spaced apart, flexible corrugated pads connecting the ends of said sections and secured to the outer surfaces of the same, said pads being larger than the sections and having their inner edges overlapping the inner edges of said sections adjacent the ends of the same, and disposed against the inner surface of the rim contiguous the edges of said rim between the sections when said sections are in normal position, and resilient means connecting said sections and rim.

3. In a device of the class described, a wheel body having a rigid rim with spaced radial openings therethrough, springs comprising radially projecting bars split longitudinally intermediate their ends to form bowed arms extending transversely across said rim, the inner ends of said springs being reduced and adapted to project through the openings in the rim, removable fastening means on the projecting portions of said reduced ends to secure the springs in position, and a plurality of tread sections secured to the outer ends of said springs.

In testimony whereof I have hereunto set my hand in presence of two subscribing witnesses.

PLATT L. HUNT.

Witnesses:
 C. BLIVEN,
 C. M. BAXTER.

Copies of this patent may be obtained for five cents each, by addressing the "Commissioner of Patents, Washington, D. C."